United States Patent
Nishizuka (10) Patent No.: US 11,489,865 B2
(45) Date of Patent: Nov. 1, 2022

(54) CONTROL DEVICE, COMMUNICATION SYSTEM, CONTROL METHOD, AND COMPUTER PROGRAM

(71) Applicant: NTT Communications Corporation, Chiyoda-ku (JP)

(72) Inventor: Kaname Nishizuka, Tokyo (JP)

(73) Assignee: NTT Communications Corporation, Chiyoda-ku (JP)

( * ) Notice: Subject to any disclaimer, the term of this patent is extended or adjusted under 35 U.S.C. 154(b) by 266 days.

(21) Appl. No.: 16/638,793

(22) PCT Filed: Aug. 17, 2018

(86) PCT No.: PCT/JP2018/030580
§ 371 (c)(1),
(2) Date: Feb. 13, 2020

(87) PCT Pub. No.: WO2019/035488
PCT Pub. Date: Feb. 21, 2019

(65) Prior Publication Data
US 2021/0136103 A1  May 6, 2021

(30) Foreign Application Priority Data
Aug. 18, 2017  (JP) .............................. JP2017-158154

(51) Int. Cl.
*H04L 29/06* (2006.01)
*H04L 9/40* (2022.01)

(52) U.S. Cl.
CPC ...... *H04L 63/1458* (2013.01); *H04L 63/1416* (2013.01); *H04L 63/1425* (2013.01)

(58) Field of Classification Search
CPC ............. H04L 63/1458; H04L 63/1416; H04L 63/1425
See application file for complete search history.

(56) References Cited

U.S. PATENT DOCUMENTS

| | | | | |
|---|---|---|---|---|
| 8,990,938 B2* | 3/2015 | Huston, III | ......... | H04L 63/1458 726/13 |
| 2006/0288413 A1* | 12/2006 | Kubota | ............... | H04L 63/1458 726/23 |
| 2018/0091547 A1* | 3/2018 | St. Pierre | ............ | H04L 63/1458 |

FOREIGN PATENT DOCUMENTS

| | | |
|---|---|---|
| JP | 2006-067078 A | 3/2006 |
| JP | 2006-352669 A | 12/2006 |

OTHER PUBLICATIONS

International Search Report dated Oct. 9, 2018 in PCT/JP2018/030580 filed on Aug. 18, 2017, 1 page.

\* cited by examiner

*Primary Examiner* — Kambiz Zand
*Assistant Examiner* — Afaq Ali
(74) *Attorney, Agent, or Firm* — Oblon, McClelland, Maier & Neustadt, L.L.P.

(57) ABSTRACT

A control device includes a controller configured to instruct a mitigation device executing a defending process against an attack on a network to execute the defending process in response to reception of a defending request indicating a request for executing the defending process. When predetermined specific data included in the received defending request is valid, the controller instructs the mitigation device to execute the defending process at an earlier timing after the reception of the defending request than when the specific data is not valid or the specific data is not included in the defending request.

6 Claims, 5 Drawing Sheets

```
module:ietf-dots-signal
  +--rw mitigation-scope
     +--rw scope*[mitigation-id]
        +--rw mitigation-id              int32
        +--rw target-ip*                 inet:ip-address
        +--rw target-prefix*             inet:ip-prefix
        +--rw target-port-range*         [lower-port upper-port]
        |  +--rw lower-port              inet:port-number
        |  +--rw upper-port              inet:port-number
        +--rw target-protocol*           unit8
        +--rw FQDN*                      inet:domain-name
        +--rw URI*                       inet:uri
        +--rw alias*                     string
        +--rw lifetime?                  int32
        +--rw urgent-flag                bool
```

CONTROL DEVICE, COMMUNICATION SYSTEM, CONTROL METHOD, AND COMPUTER PROGRAM

TECHNICAL FIELD

The present invention relates to a technology for reducing an influence of an attack on a communication device.

Priority is claimed on Japanese Patent Application No. 2017-158154, filed Aug. 18, 2017, the content of which is incorporated herein by reference.

BACKGROUND ART

There are techniques for attacking communication devices connected to networks. As one such attack technique, there is an attack that disturbs provision of services to communication devices which are attack targets (hereinafter simply referred to as an "attack"). Specific examples of attacks include a denial of service (DoS) attack and a distributed denial of service (DDoS) attack. As a defending process against a DDoS attack, there is a technology for reducing a communication load by attracting traffic transmitted from a communication device which is an attack source to a mitigation device. In addition, a technology for selecting different defending methods for a DoS attack and a DDoS attack has also been proposed (for example, see Patent Document 1).

When there is a DDoS attack, congestion occurs in a higher communication line in some cases. Therefore, it is preferable to carry out a defending process at a position closer to an attack source. To realize such a defending process, a transit service provider located at a higher position or a cloud type DDoS countermeasure service provider is requested to carry out a defending process. The defending process is requested using a telephone or electronic mail in some cases in the related art. In recent years, a DDoS Open Threat Signaling (dots) working group of Internet Engineering Task Force (IETF) has recommended standardization of an automated emergency call (signaling).

Document of Prior Art

[Patent Document]
[Patent Document 1]
Japanese Unexamined Patent Application, First Publication, No. 2006-67078

SUMMARY OF INVENTION

Problems to be Solved by the Invention

However, in the specifications of the recommendation for standardization, a side on which a defending process is requested preferentially determines that an attack arises. Therefore, clue to a circumstance such as a time necessary for the requested side to determine whether there is an attack, a timing at which the defending process is executed may be delayed.

The present invention is devised in view of such circumstances and an object of the present invention is to provide a technology capable of shortening a time necessary to execute a defending process against an attack on a communication device via a network.

Means for Solving the Problems

According to an aspect of the present invention, a control device includes a controller configured to instruct a mitigation device executing a defending process against an attack on a network to execute the defending process in response to reception of a defending request indicating a request for executing the defending process. When predetermined specific data included in the received defending request is valid, the controller instructs the mitigation device to execute the defending process at an earlier timing after the reception of the defending request than when the specific data is not valid or the specific data is not included in the defending request.

According to an aspect of the present invention, in the control device, when the specific data is valid, the controller may instruct the mitigation device to execute the defending process without executing some or all of processes executed when the specific data is not valid or the specific data is not included.

According to an aspect of the present invention, in the control device, when the specific data is valid, the controller may instruct the mitigation device to execute the defending process without executing a determination process which is a process of determining whether there is an actual attack on a network which is an execution target of the defending process.

According to another aspect of the present invention, a communication system includes: a detection device configured to detect an attack on a network and transmit a defending request indicating a request for executing a defending process for the network; a mitigation device configured to execute the defending process against the attack on the network; and a control device configured to control the mitigation device. The control device includes a controller that instructs the mitigation device to execute the defending process in response to reception of the defending request. When predetermined specific data included in the received defending request is valid, the controller instructs the mitigation device to execute the defending process at an earlier timing after the reception of the defending request than when the specific data is not valid or the specific data is not included in the defending request.

According to an aspect of the present invention, in the communication system, the detection device may validate the specific data of the defending request in accordance with a predetermined condition related to the detected attack.

According to still another aspect of the present invention, there is provided a control method in a control device that instructs a mitigation device executing a defending process against an attack on a network to execute the defending process in response to reception of a defending request indicating a request for executing the defending process. The control method includes, when predetermined specific data included in the received defending request is valid, causing the control device to instruct the mitigation device to execute the defending process at an earlier timing after reception of the defending request than when the specific data is not valid or the specific data is not included in the defending request.

According to still another aspect of the present invention, a computer program causes a computer to function as a control device including a controller that instructs a mitigation device executing a defending process against an attack on a network to execute the defending process in response to reception of a defending request indicating a request for executing the defending process. When predetermined specific data included in the received defending request is valid, the controller instructs the mitigation device to execute the defending process at an earlier timing after the reception of the defending request than when the specific data is not valid or the specific data is not included in the defending request.

Advantageous Effects of Invention

According to the present invention, it is possible to shorten a time necessary to execute a defending process against an attack on a communication device via a network.

EMBODIMENTS FOR CARRYING OUT THE INVENTION

Figure 1:
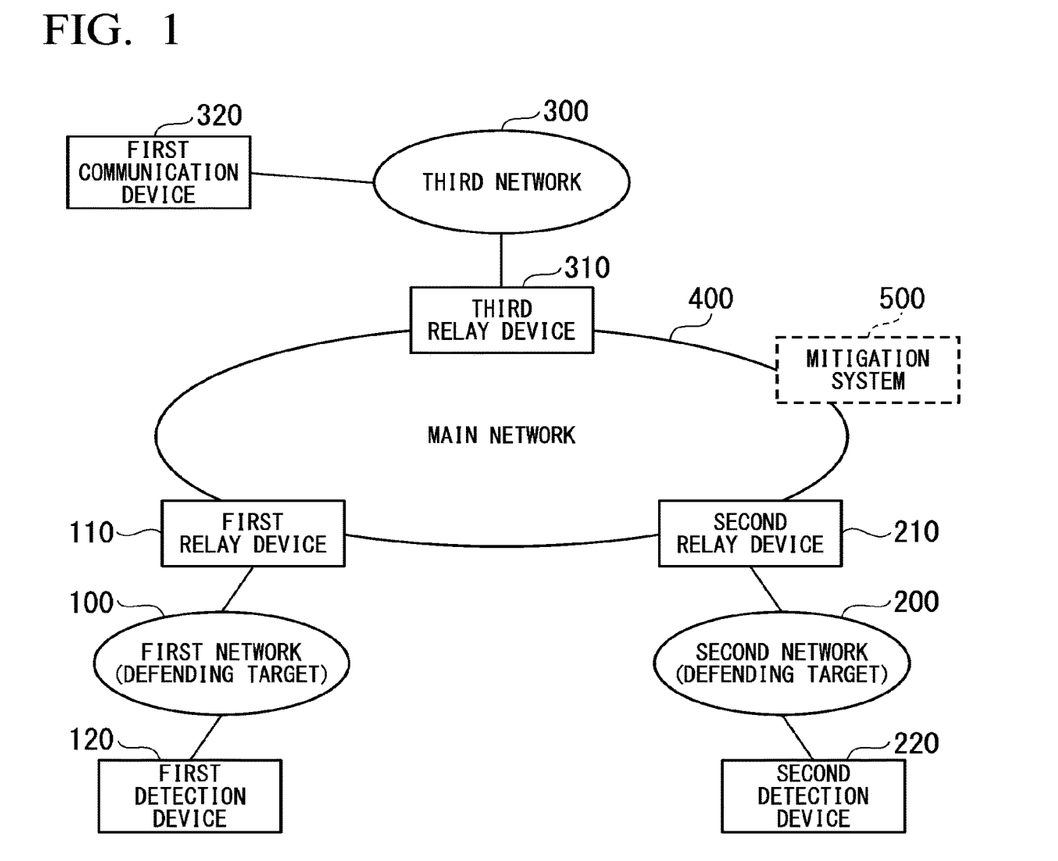
FIG. 1 is a diagram illustrating a system configuration of a communication system including a mitigation system.

FIG. 1 is a diagram illustrating a system configuration of a communication system including a mitigation system. The mitigation system is a specific example of a system executing a defending process in an embodiment. The communication system illustrated in FIG. 1 includes a first network 100, a first relay device 110, a first detection device 120, a second network 200, a second relay device 210, a second detection device 220, a third network 300, a third relay device 310, a first communication device 320, a second communication device 330, a main network 400, and a mitigation system 500.

The first network 100 is a network that is a defending target of the mitigation system 500. When there is an attack on the first network 100, the defending process of the mitigation system 500 is executed in response to a request from the first detection device 120. The first detection device 120 is connected to the first network 100. The first detection device 120 receives communication information from the first relay device 110. The first detection device 120 determines whether there is an attack on the first network 100 by analyzing the received communication information and detects the attack. When the first detection device 120 detects the attack, the first detection device 120 transmits a defending request to the mitigation system 500. The first detection device 120 may function as, for example, a dots client according to the specifications recommended for standardization by the dots working group. In this case, the defending request may be transmitted using a Signal Channel selected from two protocols (i.e., Signal Channel and Data Channel) used for communication between a dots client and a dots server.

Figure 2:
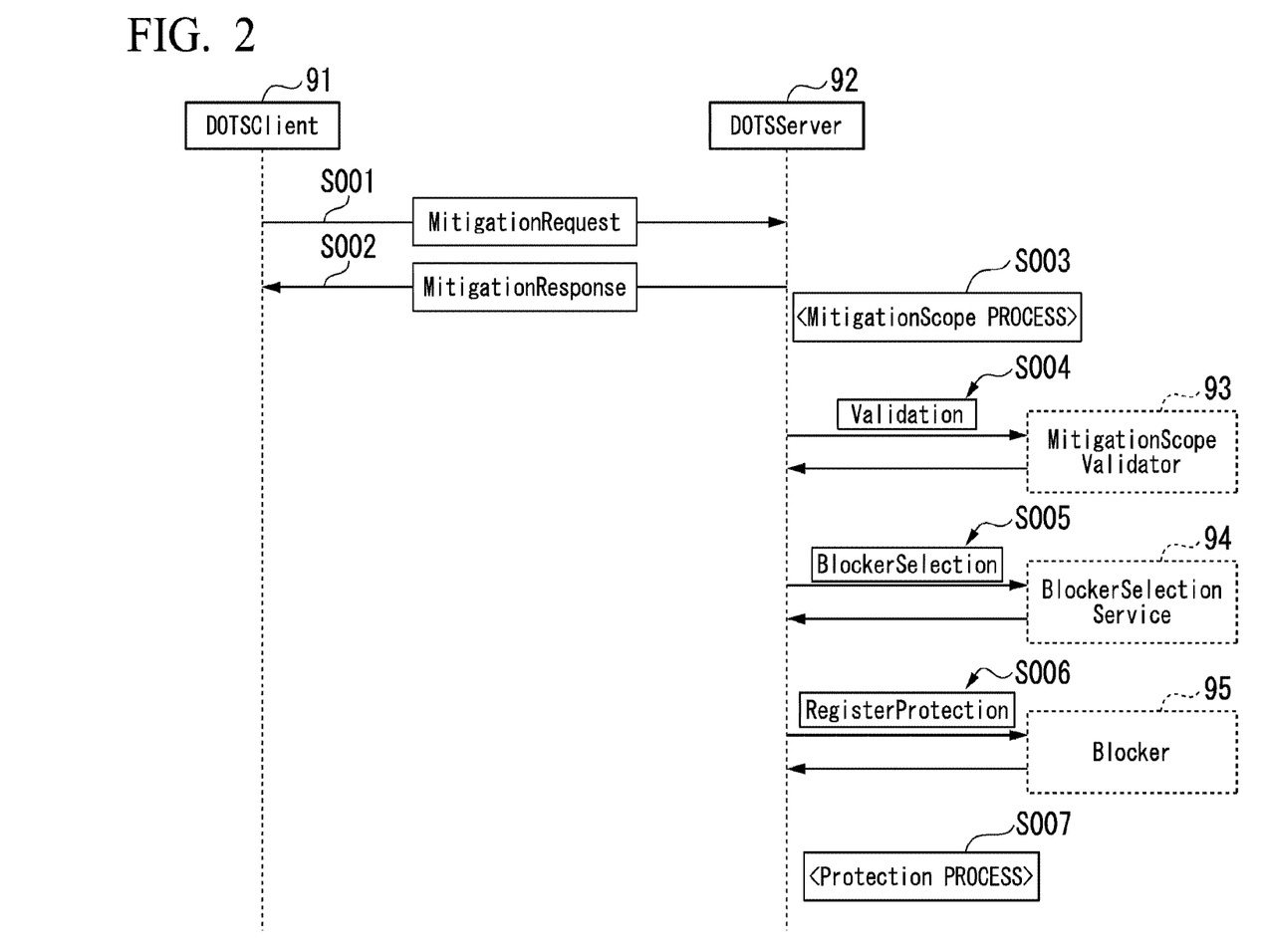
FIG. 2 is a sequence chart illustrating a specific example of communication executed between a DOTSClient and a DOTSServer.

FIG. 2 is a sequence chart illustrating a specific example of communication executed between a dots client (DOTSClient) and a dots server (DOTSServer) in the specifications of which standardization is in progress. First, DOTSClient 91 transmits MitigationRequest (equivalent to a defending request) to DOTSServer 92 (step S001). Subsequently, DOTSServer 92 transmits MitigationResponse to DOTSClient 91 (step S002). Subsequently, DOTSServer 92 executes a MitigationScope process (step S003). Subsequently, DOTS Server 92 executes a Validation procedure with MitigationScope Validator 93 (step S004). Subsequently, DOTSServer 92 executes a BlockerSelection procedure with BlockerSelection Service 94 (step S005). Subsequently, DOTSServer 92 executes a RegisterProtection procedure with Blocker 95 selected in the procedure of S005 (step S006). Thereafter, when the procedure of S006 is completed, the selected Blocker 95 executes a Protection process (equivalent to a defending process) (step S007).

The defending request includes specific data. The mitigation system 500 executes either immediate processing or normal processing depending on content of the specific data included in the defending request. When a value of the specific data indicates validation, the mitigation system 500 executes the immediate processing. Conversely, when the value of the specific data indicates invalidation or the specific data is not included in the defending request, the mitigation system 500 executes the normal processing.

In the normal processing, more processes are executed from reception of the defending request to execution of the defending process than in the immediate processing. Therefore, in the normal processing, a time necessary before start of the defending process in the mitigation system 500 is longer than in the immediate processing.

For example, in the normal processing, a process of determining whether there is an actual attack on a network which is a defending process executing target (hereinafter referred to as a "determination process") may be executed. The determination process may be executed by the mitigation system 500 or may be executed by another device determined in advance with the mitigation system 500. The determination process may be a process according to the specifications being standardized by, for example, the dots working group. In this case, the mitigation system 500 may execute the defending process only when it is determined that there is an actual attack.

For example, in the normal processing, a process of analyzing an attack on a network which is a defending process execution target (hereinafter referred to as an "analysis process") may be executed. In the analysis process, specifically, a process of determining the extent of an attack, a process of determining a type of attack, or a process of determining an emergency indicating whether it is necessary to execute a defending process on an attack urgently is executed. The analysis process may be executed by the mitigation system 500 or may be executed by another device determined in advance with the mitigation system 500.

For example, in the normal processing, a process of requesting a pre-decided supervisor to determine whether there is an actual attack on a network which is a defending process executing target (hereinafter referred to as a "confirmation process") may be executed. The confirmation process may be executed using, for example, a process of notifying a terminal device operated by a supervisor of an alarm, a process of transmitting mail, or the like. In this case, the mitigation system 500 may execute a defending process only when the supervisor determines that there is an actual attack. A determination result of the supervisor may be received, for example, from the terminal device operated by the supervisor via a communication path.

The determination process, the analysis process, and the confirmation process described as the processes executed in the normal process are all merely exemplary. Therefore, the three processes are not necessarily executed in the normal processing. A process other than the three processes may be executed in the normal processing.

In the immediate processing, a defending process is executed at an earlier timing after reception of a defending request than in the normal processing. For example, in the immediate processing, the defending process may be executed without executing some or all of the processes executed before start of execution of the defending process in the normal processing. For example, the defending process may be executed without executing the determination process, the analysis process or the confirmation process described above. A more specific example is as follows. In the immediate processing, for example, the defending process may be executed without executing any of the determination process, the analysis process, and the confirmation process. In the immediate processing, for example, the defending process in which the determination process is executed without executing the analysis process and the confirmation process may be executed. In the immediate processing, for example, the defending process in which the determination process and a part of the analysis process are executed without executing the remaining analysis process may be executed.

Figure 3:
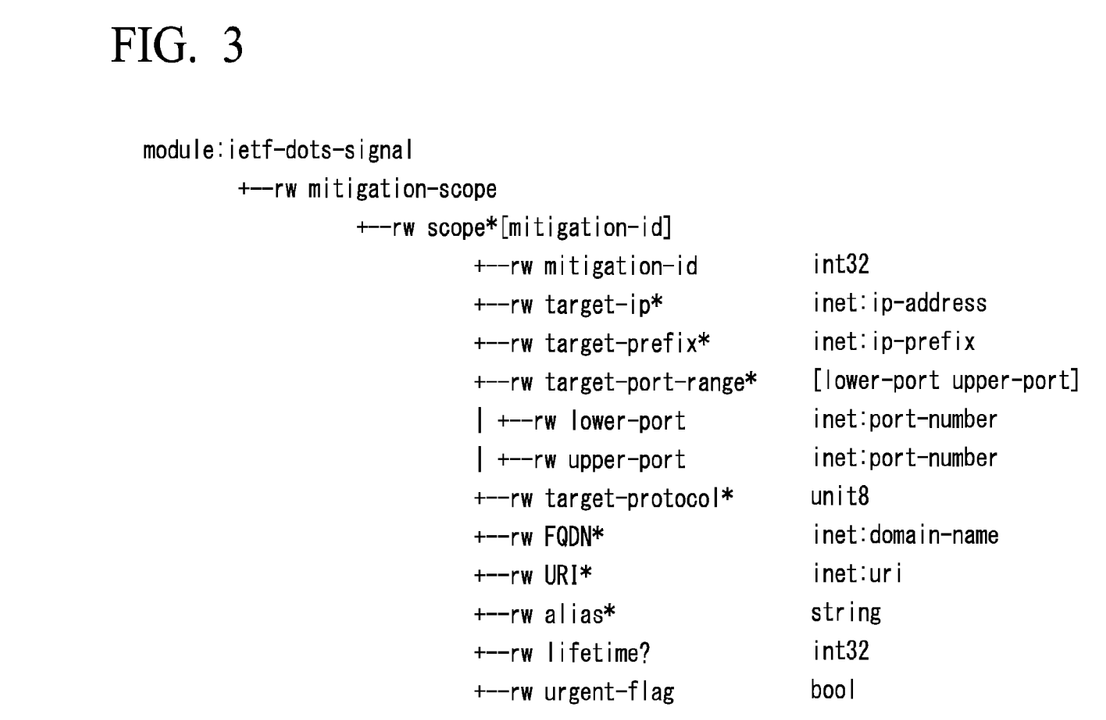
FIG. 3 is a diagram illustrating a specific example of specific data.

FIG. 3 is a diagram illustrating a specific example of specific data. FIG. 3 is a diagram illustrating a standardized format of MitigationRequest as a specific example of a defending request. In a region in which a user is allowed to make changes freely in the defending request, "urgent-flag" is provided as specific data. The specific data may be provided, for example, as a Boolean value, as illustrated in FIG. 3, or may be provided as another type of value.

The specific data is not necessarily data appropriate for the specifications being standardized by the dots working group, as illustrated in FIG. 3. The specific data may be any data as long as the data is at least data defined in advance between a device that is a transmission source and a device that is a transmission destination (for example, the mitigation system 500) of a defending request. Whether to perform a defending process immediately when a certain value is set as the specific data is preferably defined in advance on the basis of a business contract between a transmission source and a transmission destination of a defending request.

The second network 200 is a network which is a defending target of the mitigation system 500. When there is an attack on the second network 200, a defending process is executed by the mitigation system 500 on the basis of a request from the second detection device 220. The second detection device 220 is connected to the second network 200. The second detection device 220 receives communication information from the second relay device 210. The second detection device 220 detects the attack by analyzing the received communication information and determining whether there is an attack on the second network 200. When the second detection device 220 detects the attack, the second detection device 220 transmits a defending request with a value of valid specific data to the mitigation system 500. The specific data transmitted by the second detection device 220 indicates a request to execute the defending process for the second network 200 which is a defending target network.

The third network 300 is a network that is not a defending target of the mitigation system 500. The third network 300 is, for example, an unspecified Internet Protocol (IP) network. The third network 300 may be, for example, the Internet. The first communication device 320 is connected to the third network 300. The first communication device 320 is a specific example of an unspecified communication device connected to the third network 300. Hereinafter, the first communication device 320 will be described as a specific example of a device that performs an attack on the first network 100 or the second network 200.

The main network 400 includes a first relay device 110, a second relay device 210, and a third relay device 310 as gateways. The first network 100 is connected to the main network 400 via the first relay device 110. The second network 200 is connected to the main network 400 via the second relay device 210. The third network 300 is connected to the main network 400 via the third relay device 310. The main network 400 may be, for example, a network that is administrated by a service provider (carrier) that offers a connection service to an unspecified IP network to the first network 100 and the second network 200.

The mitigation system 500 is connected to the main network 400. The mitigation system 500 provides a function of a defending process against an attack to defending target networks (for example, the first network 100 and the second network 200). The mitigation system 500 may function as, for example, a dots server in the specifications of which standardization is in progress by the dots working group.

Figure 4:
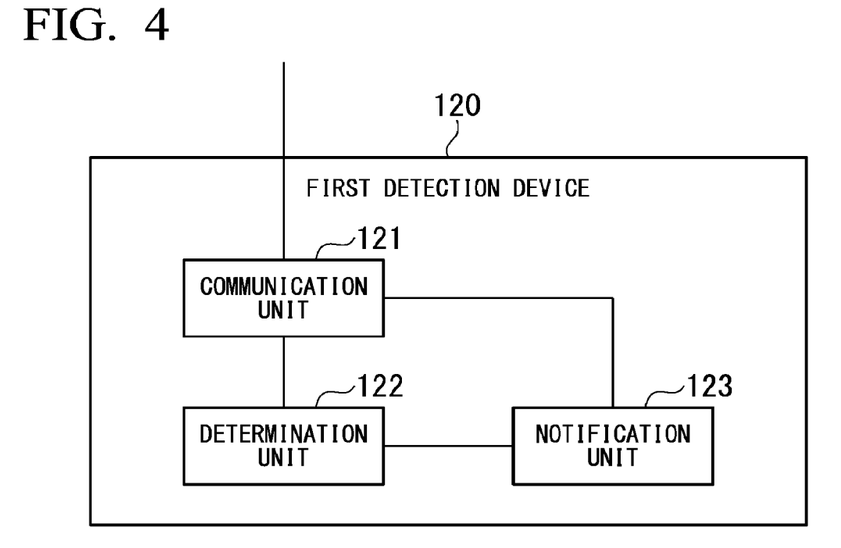
FIG. 4 is a schematic block diagram illustrating a functional configuration of a first detection device.

FIG. 4 is a schematic block diagram illustrating a functional configuration of the first detection device 120. The first detection device 120 is configured using an information processing device such as a blade server, a workstation, or a personal computer. The first detection device 120 includes a processor, a memory, and an auxiliary storage device connected via a bus. The first detection device 120 functions as a device that includes a communication unit 121, a determination unit 122, and a notification unit 123 by executing a detection program. All or some of the functions of the first detection device 120 may be realized using hardware such as an application specific integrated circuit (ASIC), a programmable logic device (PLD), or a field programmable gate array (FPGA). The detection program may be recorded on a computer-readable recording medium. The computer-readable recording medium is, for example, a portable medium such as a flexible disk, a magneto-optical disc, a ROM, a CD-ROM, or a semiconductor storage device (for example, a solid-state drive (SSD)), or a storage device such as a hard disk embedded in a computer system or a semiconductor storage device. The detection program may be transmitted via an electrical communication line.

The communication unit 121 is configured using a communication device such as a communication interface. The communication unit 121 may execute wired communication or may execute wireless communication. The communication unit 121 communicates with the first relay device 110 and the mitigation system 500. The communication unit 121 receives, for example, communication information from the first relay device 110. The communication information is information regarding communication relayed by the first relay device 110. The communication information may include, for example, information regarding a packet relayed by the first relay device 110. The communication unit 121 transmits, for example, a defending request generated by the notification unit 123 to the mitigation system 500.

The determination unit 122 determines whether there is an attack on the first network 100 which is a defending target based on the communication information received from the first relay device 110. For example, a flow technology which is one of the traffic analysis technologies may be applied to the determination unit 122. As a specific example of an attack to be detected, there is an attack that disturbs provision of a service to a communication device by placing an excessive load on the communication device (a high-load attack). As an example of a more specific attack, there is a DoS attack or a DDoS attack such as HTTP Get flood or TCP SYN flood. When there is an attack, the determination unit 122 determines a type of the attack. The determination unit 122 notifies the notification unit 123 of a determination result.

The notification unit 123 notifies the mitigation system 500 of a defending request in accordance with a result of the determination executed by the determination unit 122. For example, the notification unit 123 generates a defending request including the type of attack on the first network 100, information indicating a network (for example, the first network 100) which is an attacking target, and specific data. As the information indicating the network which is an attacking target, information indicating an address space of the network may be used, or identification information such as a number or a name allocated in advance to the network may be used. The notification unit 123 notifies the mitigation system 500 of a request for executing the defending process, the type of the attack, or the like by transmitting the generated defending request to the mitigation system 500.

The notification unit 123 may validate the specific data of the defending request when a predetermined condition is satisfied, or invalidate the specific data of the defending request when the predetermined condition is not satisfied. The predetermined condition may be, for example, a condition related to a determination result by the determination unit 122. More specifically, for example, when the type of the attack matches one type of attack or a plurality of types of attacks decided in advance, the predetermined condition may be determined to be satisfied. The predetermined condition may not be limited to the type of the attack.

The first detection device 120 has been described above. The second detection device 220 has a similar configuration to the first detection device 120. Here, a network which is a defending target of the second detection device 220 is not the first network 100 but the second network 200.

Figure 5:
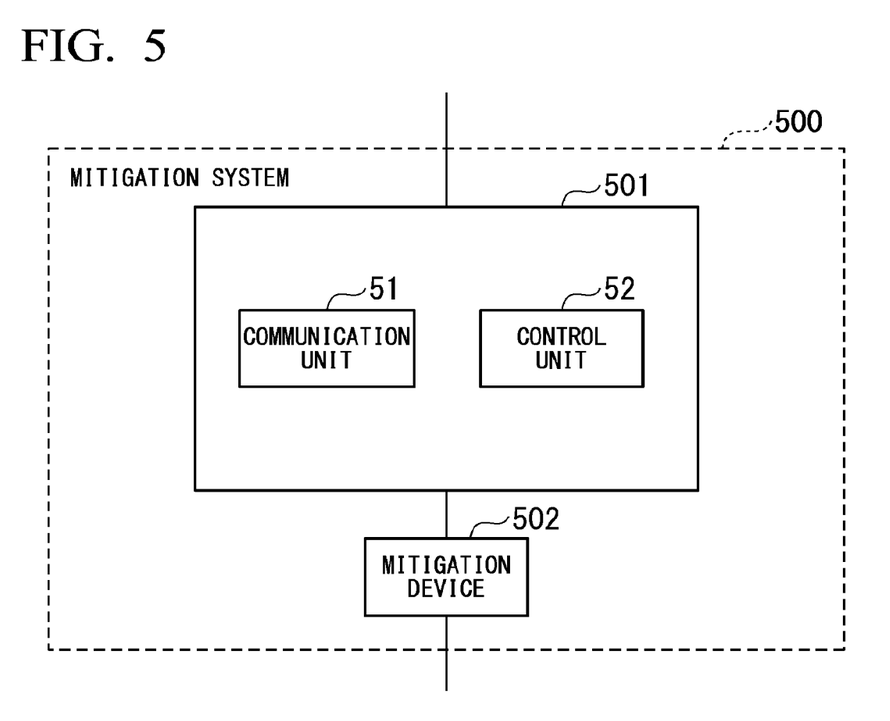
FIG. 5 is a schematic block diagram illustrating a system configuration of the mitigation system.

FIG. 5 is a schematic block diagram illustrating a system configuration of the mitigation system 500. The mitigation system 500 includes a control device 501 and a mitigation device 502.

The control device 501 is configured using an information processing device such as a blade server, a workstation, or a personal computer. The control device 501 includes a processor, a memory, and an auxiliary storage device connected via a bus. The control device 501 functions as a device that includes a communication unit 51 and a control unit (controller) 52 by executing a mitigation control program. All or some of the functions of the control device 501 may be realized using hardware such as an ASIC, a PLD, or an MPGA. The mitigation control program may be recorded on a computer-readable recording medium. The computer-readable recording medium is, for example, a portable medium such as a flexible disk, a magneto-optical disc, a ROM, a CD-ROM, or a semiconductor storage device (for example, a solid-state drive (SSD)), or a storage device such as a hard disk embedded in a computer system or a semiconductor storage device. The mitigation control program may be transmitted via an electrical communication line.

The communication unit 51 is configured using a communication device such as a communication interface. The communication unit 51 may execute wired communication or may execute wireless communication. The communication unit 51 communicates with the mitigation device 502 and a communication device such as the first relay device 110. The communication unit 51 receives, for example, a defending request. The communication unit 51 transmits, for example, an instruction to execute a defending process to the mitigation device 502.

The control unit (controller) 52 instructs the mitigation device 502 to execute the defending process in response to the defending request received from a detection device (for example, the first detection device 120 or the second detection device 220). The control unit (controller) 52 executes the normal processing when the specific data of the defending request is not valid or the defending request includes no specific data. Conversely, when the specific data of the defending request is valid, the control unit (controller) 52 executes the immediate processing.

The mitigation device 502 is a device that executes a defending process (an attack stopping process) for communication of an attack. The mitigation device 502 executes path control for receiving the communication of the attack by the own device when an instruction to execute the defending process is received from the control device 501. The path control may be executed using, for example, a border gateway protocol (BGP). The mitigation device 502 may execute path control by notifying a relay device inside the main network 400 of, for example, information indicating target communication received by the own device (hereinafter referred to as "communication identification information") and destination information of the own device which is a relay destination of the target communication. The path control may be executed on a relay device (in the embodiment, the third relay device 310) which is an inflow source of the communication of the attack.

The mitigation device 502 executes the defending process when a packet of the communication of the attack is received after the above-described path control. The mitigation device 502 executes the defending process, for example, by discarding the packet of the communication of the attack. As the defending process executed by the mitigation device 502, there are a plurality of schemes. Any defending process may be implemented in the mitigation device 502. A plurality of types of defending processes may be implemented in the mitigation device 502.

Figure 6:
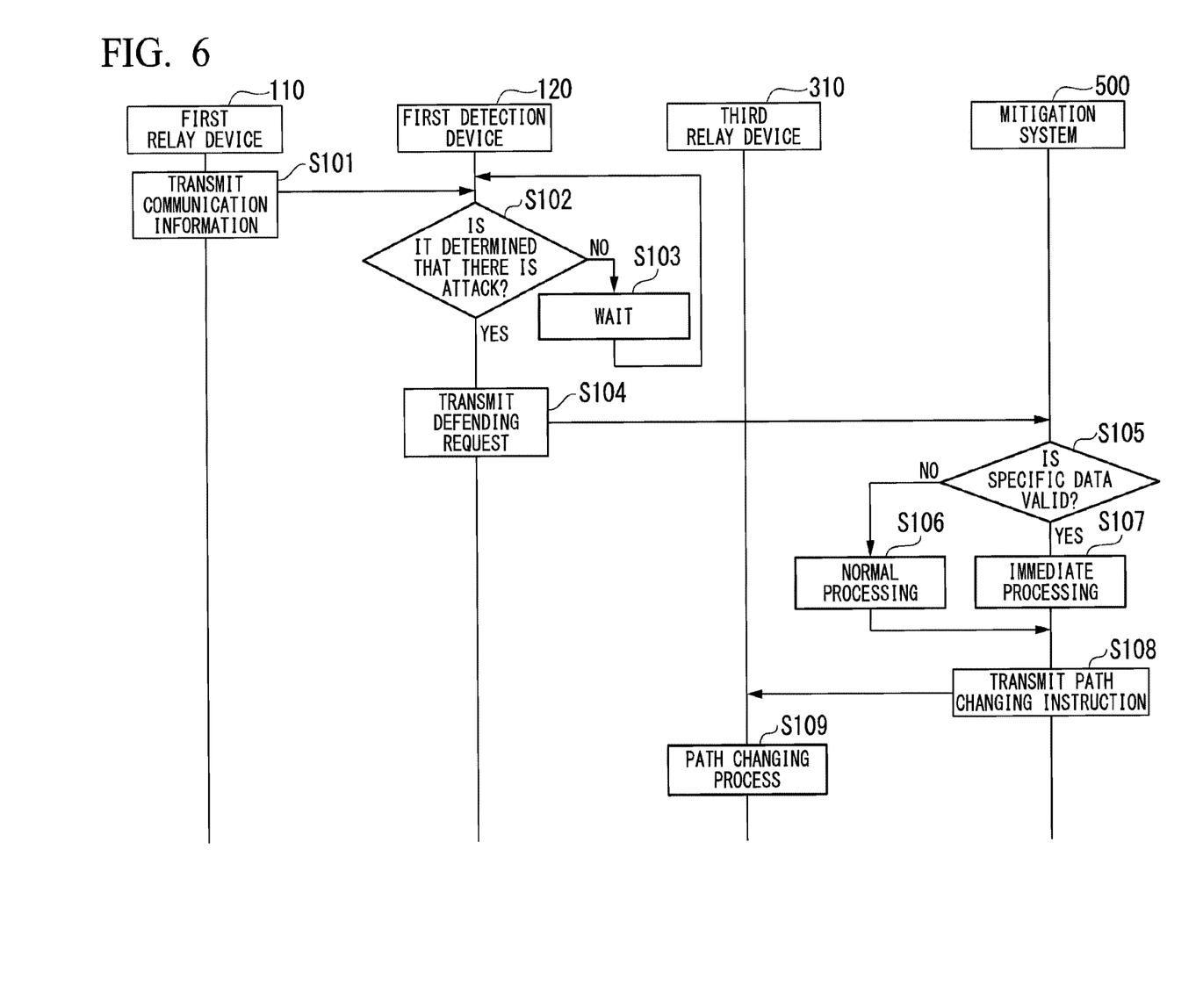
FIG. 6 is a sequence chart illustrating a flow of a process in the communication system.

FIG. 6 is a sequence chart illustrating a flow of a process in the communication system. In an example of FIG. 6, it is assumed that a communication device connected to the first network 100 is attacked from the first communication device 320 connected to the third network 300.

When a predetermined timing arrives, the first relay device 110 transmits information regarding communication (communication information) relayed to the first network 100 which is a defending target to the first detection device 120 (step S101). The predetermined timing may be a timing that arrives at a constant period (for example, every second, every minute, or every 5 minutes), may be a timing at which a predetermined condition related to communication is satisfied (for example, a timing at which an amount of communication relayed to the first network 100 exceeds a threshold), or may be another timing.

The determination unit 122 of the first detection device 120 receives the communication information. The first detection device 120 determines whether there is an attack based on the received communication information (step S102). When it is determined that there is no attack (NO in step S102), the determination unit 122 waits until subsequent communication information is received (step S103). When the subsequent communication information is received, the determination unit 122 executes the process of step S102 on the received communication information.

Conversely, when it is determined that there is the attack (YES in step S102), the determination unit 122 notifies the notification unit 123 of a determination result. When the notification unit 123 is notified of the determination result indicating that there is the attack, the notification unit 123 transmits a defending request including the specific data in accordance with the predetermined condition to the mitigation system 500 (step S104).

The control device 501 of the mitigation system 500 receives the defending request from the first detection device 120. The control device 501 determines whether the specific data of the received defending request is valid (step S105). When the specific data is not valid (NO in step S105), the control device 501 executes the normal processing (step S106). Conversely, when the specific data is valid (YES in step S105), the control device 501 executes the immediate processing (step S107). That is, in this case, the defending process is executed at an earlier timing than when the specific data is not included. The mitigation device 502 receiving the instruction to execute the defending process executes the defending process. For example, the mitigation device 502 transmits a path changing instruction to a relay device inside the main network 400 to relay the communication of the attack to the own device (step S108). In the example of FIG. 6, the mitigation device 502 instructs the third relay device 310 to change the path so that the communication transmitted from the first communication device 320 to the first network 100 is relayed to the own device. The third relay device 310 receiving the path changing instruction executes path control so that the communication transmitted from the first communication device 320 to the first network 100 is relayed to the mitigation device 502 (step S109). The execution of the path control may be realized using, for example, BGP, as described above. After the path control is executed, the communication (the communication of the attack) transmitted from the first communication device 320 to the first network 100 is relayed to the mitigation device 502.

In the communication system configured in this way according to the embodiment, it is possible to shorten a time necessary until the execution of the defending process against the attack on the communication device via the network. Hereinafter, advantageous effects of the embodiment will be described in detail.

In a DDoS attack which is a current mainstream, an attack is established in a short time of about 30 minutes in many cases. An action of demanding money is also executed by establishing the attack in the short time and using cancellation of the attack as a threat. Therefore, the defending process is required to start appropriately in a very short time (for example, about 10 minutes) after the attack occurs.

For such a request, a value of the specific data is defined in the defending request in the communication system according to the embodiment. When the specific data of the defending request is valid, the immediate processing is executed. For example, in accordance with the fact that the specific data is valid, the defending process starts without executing the determination process, the analysis process, or the confirmation process in a defending target network. Therefore, it is possible to shorten a time necessary from the detection of the attack to the execution of the defending process.

In the embodiment, even when services of a plurality of DDoS countermeasure service providers are used in a defending target network, it is possible to shorten a time until the execution of the defending process similarly. For a subject executing the defending process, a business relation regarding whether to trust the defending request can be smoothly constructed.

In the system receiving the request of the defending request, even when the immediate processing in accordance with the specific data is not corresponded, a process of the related art can be executed if a specification except for the specific data is a specification in accordance with the standardization. Therefore, it is possible to keep interconnectivity with a system which does not correspond to the specific data.

Modification Examples

The control device 501 may request another mitigation system to execute a defending process when the defending process may not be executed in the mitigation system 500 in which the own device is provided. In this case, when the received defending request includes the specific data, the control device 501 may transmit the defending request including the specific data to another mitigation system.

The mitigation system 500 may include the plurality of mitigation devices 502. Different defending processes may be mounted in the respective mitigation devices 502. In this case, the control device 501 may select the mitigation device 502 appropriate in accordance with a type of attack on a defending target network. The control device 501 instructs the selected mitigation device 502 to execute the defending process.

The embodiment of the present invention has been described in detail with reference to the drawings, but a specific configuration is not limited to the embodiment. Designs or the like within the scope of the present invention without departing from the gist of the present invention are also included.

INDUSTRIAL APPLICABILITY

The embodiment can be applied to a device that executes a defending process against an attack on a communication device via a network.

REFERENCE SIGNS LIST

100 First network
110 First relay device
120 First detection device
121 Communication unit
122 Determination unit
123 Notification unit
200 Second network
210 Second relay device
220 Second detection device
300 Third network
310 Third relay device
320 First communication device
400 Main network
500 Mitigation system
501 Control device
51 Communication unit
52 Control unit (Controller)
502 Mitigation device

The invention claimed is:

1. A control device comprising:
a controller configured to instruct a mitigation device executing a defending process against an attack on a network to execute the defending process in response to reception of a defending request indicating a request for executing the defending process,
wherein, when predetermined specific data included in the received defending request is valid, the controller instructs the mitigation device to execute the defending process at an earlier timing after the reception of the defending request than when the specific data is not valid or the specific data is not included in the defending request by instructing the mitigation device to execute the defending process without executing some or all of processes executed when the specific data is not valid or the specific data is not included, wherein the specific data is defined in advance between a first subject providing the defending process by the mitigation device and a second subject receiving a provided defending process, and wherein the specific data indicates that the type of the attack the second subject is receiving matches one type of attack or a plurality of types of attacks decided in advance.

2. The control device according to claim 1, wherein, when the specific data is valid, the controller instructs the mitigation device to execute the defending process without executing a determination process which is a process of determining whether there is an actual attack on a network which is an execution target of the defending process.

3. A communication system comprising:
a detector configured to detect an attack on a network and transmit a defending request indicating a request for executing a defending process for the network;
a mitigator configured to execute the defending process against the attack on the network; and
a control device configured to control the mitigator,
wherein the control device includes a controller configured to instruct the mitigator to execute the defending process in response to reception of the defending request,
wherein, when predetermined specific data included in the received defending request is valid, the controller instructs the mitigator to execute the defending process at an earlier timing after the reception of the defending request than when the specific data is not valid or the specific data is not included in the defending request by instructing the mitigator to execute the defending process without executing some or all of processes executed when the specific data is not valid or the specific data is not included,
wherein the specific data is defined in advance between a first subject providing the defending process by the mitigator and a second subject receiving a provided defending process, and
wherein the specific data indicates that the type of the attack the second subject is receiving matches one type of attack or a plurality of types of attacks decided in advance.

4. The communication system according to claim 3, wherein the detector validates the specific data of the defending request in accordance with a predetermined condition related to the detected attack.

5. A control method in a control device that instructs a mitigation device executing a defending process against an attack on a network to execute the defending process in response to reception of a defending request indicating a request for executing the defending process, the control method including, determining whether or not predetermined specific data included in the received defending request is valid, and when the predetermined specific data included in the received defending request is valid, causing the control device to instruct the mitigation device to execute the defending process at an earlier timing after reception of the defending request than when the specific data is not valid or the specific data is not included in the defending request by instructing the mitigation device to execute the defending process without executing some or all of processes executed when the specific data is not valid or the specific data is not included, wherein the specific data is defined in advance between a first subject providing the defending process by the mitigation device and a second subject receiving a provided defending process, and wherein the specific data indicates that the type of the attack the second subject is receiving matches one type of attack or a plurality of types of attacks decided in advance.

6. A non-transitory computer-readable storage medium storing a computer program causing a computer to function as a control device including a controller that instructs a mitigation device executing a defending process against an attack on a network to execute the defending process in response to reception of a defending request indicating a request for executing the defending process, wherein, when predetermined specific data included in the received defending request is valid, the controller instructs the mitigation device to execute the defending process at an earlier timing after the reception of the defending request than when the specific data is not valid or the specific data is not included in the defending request by instructing the mitigation device to execute the defending process without executing some or all of processes executed when the specific data is not valid or the specific data is not included, wherein the specific data is defined in advance between a first subject providing the defending process by the mitigation device and a second subject receiving a provided defending process, and wherein the specific data indicates that the type of the attack the second subject is receiving matches one type of attack or a plurality of types of attacks decided in advance.

* * * * *